United States Patent [19]

Hoover

[11] 4,178,068
[45] Dec. 11, 1979

[54] FIBER OPTIC CABLE TERMINATION MEANS

[75] Inventor: Charles D. Hoover, Harrisburg, Pa.

[73] Assignee: AMP Incorporated, Harrisburg, Pa.

[21] Appl. No.: 851,339

[22] Filed: Nov. 14, 1977

[51] Int. Cl.² ............................................. G02B 5/14
[52] U.S. Cl. ................................ 350/96.21; 350/96.22
[58] Field of Search ................. 350/96.20, 96.21, 96.22

[56] References Cited

U.S. PATENT DOCUMENTS

| | | | |
|---|---|---|---|
| 3,809,908 | 5/1974 | Clanton | 350/96.20 X |
| 3,897,134 | 7/1975 | Scrivo et al. | 350/96.22 |
| 3,901,574 | 8/1975 | Paullus et al. | 339/90 R |
| 3,904,269 | 9/1975 | Lebduska et al. | 350/96.22 |
| 3,999,837 | 12/1976 | Bowen et al. | 350/96.22 |
| 4,081,208 | 3/1978 | Meade | 350/96.20 |

FOREIGN PATENT DOCUMENTS

| | | | |
|---|---|---|---|
| 2508488 | 9/1976 | Fed. Rep. of Germany | 350/96.20 |
| 2651768 | 5/1977 | Fed. Rep. of Germany | 350/96.22 |

*Primary Examiner*—John K. Corbin
*Assistant Examiner*—John D. Lee
*Attorney, Agent, or Firm*—Gerald K. Kita

[57] ABSTRACT

An improved fiber optic cable termination means is disclosed which enables the use of such cable in electrical connector housings of known configurations. The present fiber optic cable termination means is adopted to be used in replacement of a standard electrical cable connector termination in a standard housing so that existing connector housings can be used in the fiber optics industry. The subject termination means also enables the hybrid use of connectors having both optical fiber cables as well as conventional electrical cables, including coaxial cables, connected thereto.

6 Claims, 4 Drawing Figures

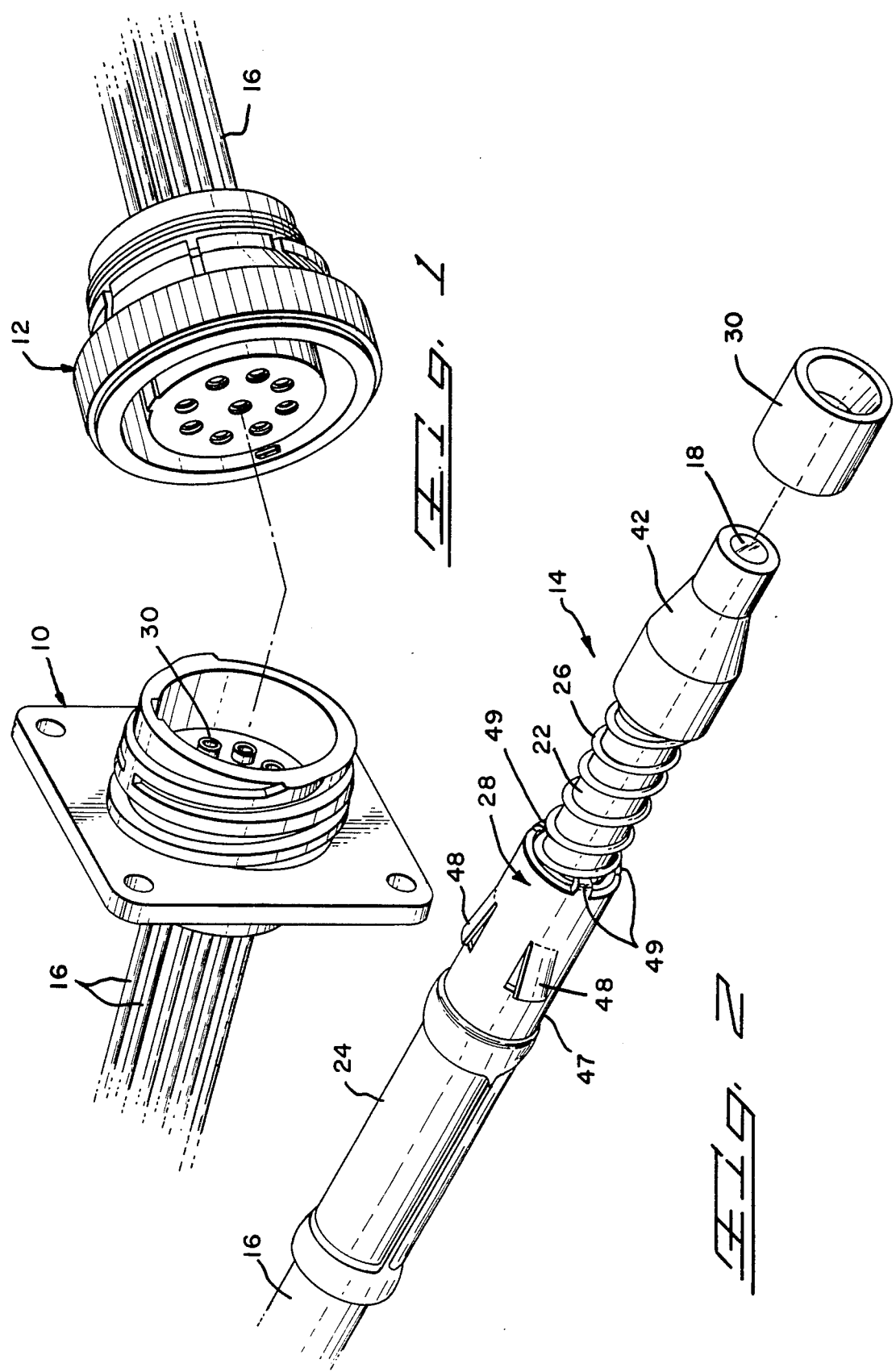

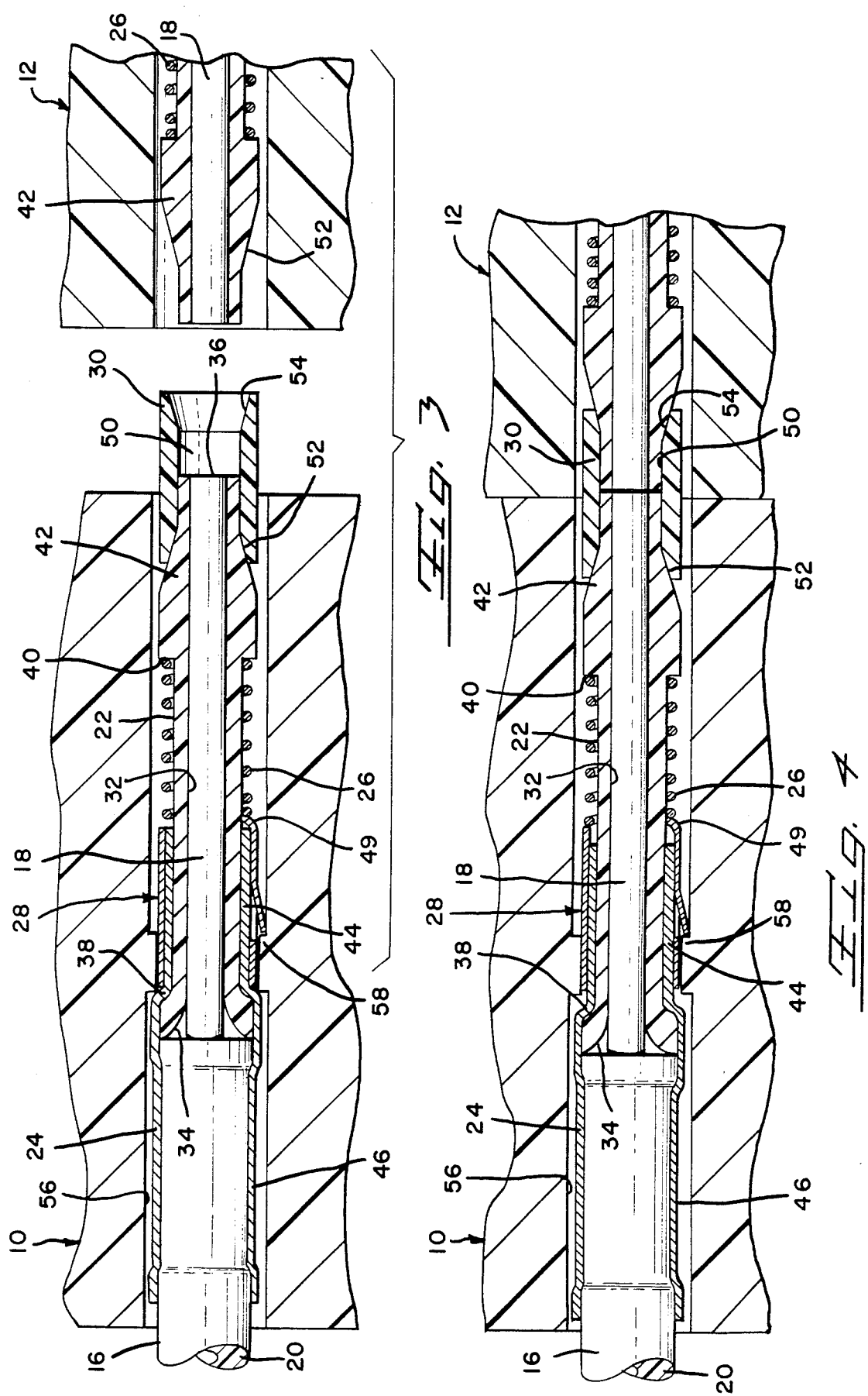

FIBER OPTIC CABLE TERMINATION MEANS

BACKGROUND OF THE INVENTION

1. The Field Of The Invention

The present invention relates to an improved termination means for fiber optic cables and in particular to a termination means which allows mounting of a fiber optic cable into a conventional electrical connector housing of known configuration.

2. The Prior Art

The present invention represents an improvement in means for terminating optical fiber cables and represents a direct improvement over the connector disclosed in U.S. Pat. No. 3,999,837 in that it allows a fiber optic cable to be terminated in such a manner that it can be utilized with a standard and well known electrical connector housing.

One of the prime disadvantages in the field of fiber optic cables has been the stringent requirements for alignment of the cables and the difficulties encountered in utilizing previously known termination means and connectors in the fiber optics area. The present invention overcomes many of the problems encountered by the prior art and allows the utilization of an optical fiber cable in standard electrical connector housings.

SUMMARY OF THE INVENTION

The subject improved termination means for optical fiber cables having at least one optical fiber enclosed in a jacketing layer includes a multi-mate profile ferrule member, a biasing spring mounted on the ferrule, a crimp sleeve mounted on the ferrule member and to the optical fiber cable, a retention spring mounted on the crimp sleeve, and a splice bushing. The ferrule member has a through bore from a flared rear end portion to a profiled nose portion which includes an outwardly directed annular shoulder and a tapered profiled forward end. The jacketing is stripped from an end of the cable to expose the at least one fiber which is then inserted through the bore and annularly compressed in the nose portion and secured therein. The crimp sleeve is positioned over the rear of the ferrule member and the leading end of the optical fiber cable and is secured thereon. The retention spring is mounted around the exterior of the crimp sleeve and includes at least one outwardly directed locking lance. The biasing spring is positioned between the retention spring and the annular shoulder of the ferrule member allowing axial float of the optical fiber termination with respect to the retention spring. The terminated cable is mounted in a conventional electrical connector housing in the normal manner with the splice bushing on the nose portion thereof. The splice bushing serves to align and join a coacting, similarly terminated optical fiber cable when the connector members are joined.

It is therefore an object of the present invention to produce an improved termination means for optical fiber cables which enable the thus terminated cables to be mounted in conventional electrical connector housings of known configurations.

It is a further object of the present invention to produce a termination means for optical fiber cables which allows accurate alignment of cables in a joined or mated condition.

It is yet another object of the present invention to produce an improved termination means for optical fiber cables which allow limited axial float of cables thus terminated to prevent actual abutment of the cables, to compensate for production tolerances in an electrical connector, and to provide good axial alignment and low loss coupling of optical fiber cables.

The means for accomplishing the foregoing objects and other advantages of the present invention, which will be apparent to those skilled in the art, are set forth in the following detailed description taken with reference to the accompanying drawings.

BRIEF DESCRIPTION OF THE DRAWINGS

FIG. 1 is an exploded perspective view of a conventional electrical connector incorporating fiber optic cables terminated by the subject invention;

FIG. 2 is a partially exploded perspective view of an optical fiber cable terminated by the subject invention;

FIG. 3 is a detailed longitudinal section through an optical fiber cable terminated by the present invention and mounted in a portion of a connector housing such as that shown in FIG. 1; and FIG. 4 is a longitudinal section, similar to FIG. 3, showing the connector in the fully mated condition.

DETAILED DESCRIPTION OF THE PREFERRED EMBODIMENT

FIG. 1 shows a known electrical connector having a panel mountable receptacle portion 10 and a cable mounted plug portion 12. This electrical connector is of a well known type and is described in U.S. Pat. No. 3,901,574, the disclosure of which is incorporated herein by reference. This connector is merely representative of the known electrical connector housings which can be used to accommodate optical cables terminated in accordance with the present invention.

The subject optical fiber cable termination means 14 is shown in FIG. 2 mounted on a cable 16 having at least one optical fiber 18 encased within a jacketing layer 20. The subject termination means includes a ferrule member 22, a crimp sleeve 24, a biasing spring 26, a retention spring 28 and a splice bushing 30.

The ferrule member 22 has an axial through bore 32 extending between the inwardly tapered rear entry 34 to the mating face 36. The outer profile of the ferrule member 22 includes an outwardly directed rear shoulder 38, an outwardly directed forward shoulder 40, and a tapered nose portion 42.

The crimp sleeve 24 has a forward portion 44 with an inner diameter substantially the same as the outer diameter of the ferrule member 22 and a rear portion 46 having an inner diameter substantially equal to the outer diameter of the cable jacketing 20. When the crimp sleeve 24 is crimped onto the ferrule member 22 and cable 16, it provides strain relief.

The retention spring 28 is an annular or barrel member 47 having at least one locking lance 48 extending outwardly therefrom and at least one inwardly directed flange 49 at the forward end against which spring 26 reacts. The retention spring 28 is adapted to be loosely received over the smaller front portion 44 of the crimp sleeve 24 for relative axial movement therebetween.

The biasing spring 26 is preferably a helical compression spring and is mounted on the ferrule body 22 between the front annular shoulder 40 and the retention spring 28.

The splice bushing 30 has an annular bore 50 with conical inwardly tapered lead ends 52, 54 which receive therein the tapered noses 42 of the ferrule members 22.

The optical fiber cable 16 would be terminated in the following manner. The ferrule member 22 would be pre-assembled to have the compression spring 26, crimp sleeve 24 and retention spring 28 pre-positioned thereon. The jacketing 20 would be stripped from the free end of the cable and the fiber or fibers 18 thereof inserted into the profiled through bore 32 of the ferrule member 22. The fiber 18 would be pushed into the ferrule member 22 sufficient to project beyond the face 36. The crimp sleeve 24 would then be crimped under pressure, by known crimping means (not shown) to secure the cable in the subject termination means 14. The nose of the ferrule member would then be put in a splice polishing bushing similar to that shown in FIG. 11 of the aforementioned U.S. Pat. No. 3,999,837. The fiber 18 and nose 42 would then be polished to produce a smooth front face 36. It should be noted that, in particular, in the case of a multiple fiber cable, the polishing would be accompanied by a radial compression of the nose portion 42 of the ferrule member 22 to assure compression of the fibers and accurate centering of the fibers 18 within the ferrule member 22. Prior to the polishing action the fiber can be bonded into the ferrule by known adhesives and bonding agents.

The thus terminated cable is then inserted into contact receiving bores 56 of a known connector housing 10 or 12 in the identical fashion as used to insert appropriately terminated electrical cables. The locking lances 48 of the retention spring 28 will engage shoulders 58 to lock the cable 16 in the housing and hold it securely in place. The splice bushing 30 is then placed over the nose of the ferrule and will normally project slightly from the mating face of the connector member, as shown in FIG. 3 and in the receptacle 10 of FIG. 1.

It will be noted from FIGS. 3 and 4 that the action of mating the connector halves will cause the aligned optical fiber cables to be appropriately mated in the splice bushing in an aligned and slightly spaced condition. The spring members 26 will allow for axial movement of the cable 16 with respect to the retention spring 28 so that the faces 36 will not be driven into an abutting condition, which could cause damage to the polished face of the cable.

The present invention may be subject to many modifications and changes without departing from the spirit or essential characteristics thereof. The present embodiment is therefore to be considered in all respects as illustrative and not restrictive of the scope of the invention.

What is claimed is:

1. A preassembled optic cable connector which is spring loaded and self-latching upon insertion thereof within a housing provided with a cavity for mounting said connector, comprising:

a unitary ferrule having a concentric bore in which is mounted a light transmitting core of an optic cable with a polished end of said core at a mating forward end of said ferrule, a rearward end of said ferrule being joined to said optic cable by a crimp sleeve encircling and radially gripping both said ferrule rearward end and said optic cable, said crimp sleeve having a projecting shoulder to limit forward movement of said ferrule and said cable in a connector housing cavity, a retention sleeve slideably mounted over said crimp sleeve and having means projecting therefrom to limit rearward movement of said retention sleeve in a connector housing, said means being capable of deflection in response to forward movement of said retention sleeve in a housing cavity, said crimp sleeve shoulder being engagable against a rearward end of said retention sleeve to limit forward movement of said ferrule and said cable relative to said retention sleeve, and a helically coiled spring freely encircling said ferrule and having a forward end engagable against a projecting shoulder portion of said ferrule, a rearward end of said spring being engagable against a forward end of said retention sleeve with the coils of said spring being resiliently compressed by movement of said ferrule and said cable rearwardly relative to said retention sleeve.

2. The structure as recited in claim 1, wherein, said retention sleeve forward end comprises one or more flanges directed inward radially and being engagable by the rearward end of said spring.

3. The structure as recited in claim 1, and further including:

a bushing having a profiled bore therethrough receiving in one end thereof said ferrule forward end together with said polished end of said cable core, said bushing bore adapted to receive in the other end thereof another ferrule forward end provided with a corresponding polished end of another cable core.

4. The combination of a housing and a preassembled optic cable connector which is spring loaded and self-latching upon insertion thereof within a cavity of said housing:

a unitary ferrule having a concentric bore in which is mounted a light transmitting core of an optic cable with a polished end of said cable core at a mating forward end of said ferrule, a rearward end of said ferrule being joined to said optic cable by a crimp sleeve encircling and radially gripping said ferrule rearward end and said optic cable, said housing including a shoulder within said cavity, said crimp sleeve having a projecting shoulder engagable against a rearward surface of said housing shoulder to limit forward movement of said ferrule and said cable in said housing cavity, a retention sleeve slidably mounted over said crimp sleeve and having means projecting therefrom and engagable against a forward surface of said housing shoulder to limit rearward movement of said retention sleeve in said housing cavity, said means being capable of deflection in response to forward movement of said retention sleeve along said housing cavity and past said housing shoulder, said crimp sleeve shoulder being engagable against a rearward end of said retention sleeve to limit forward movement of said ferrule and said cable relative to said retention sleeve, and a helically coiled spring freely encircling said ferrule and having a forward end engagable against a projecting shoulder portion of said ferrule, a rearward end of said spring being engagable against a forward end of said retention sleeve with the coils of said spring being resiliently compressed by movement rearwardly of said ferrule and said cable relative to said retention sleeve.

5. The structure as recited in claim 4, wherein, said retention sleeve forward end comprises one or more flanges directed inward radially and engagable by said rearward end of said spring.

6. The structure as recited in claim 4, and further including:
a bushing having a profiled bore therethrough receiving in one end thereof said ferrule forward end together with said polished end of said cable core, said bushing bore adapted to receive in the other end thereof another ferrule forward end provided with a corresponding polished end of another cable core.

* * * * *